I. ALEXANDER.
EYE-GLASS.

No. 174,753. Patented March 14, 1876.

WITNESSES
A. G. De Long.
M. A. Moquin

By

INVENTOR
Isaac Alexander.

Attorney

N. PETERS, PHOTO-LITHOGRAPHER, WASHINGTON, D.C.

UNITED STATES PATENT OFFICE.

ISAAC ALEXANDER, OF WASHINGTON, DISTRICT OF COLUMBIA.

IMPROVEMENT IN EYEGLASSES.

Specification forming part of Letters Patent No. 174,753, dated March 14, 1876; application filed February 19, 1876.

*To all whom it may concern:*

Be it known that I, ISAAC ALEXANDER, of the city of Washington, in the county of Washington and District of Columbia, have invented certain new and useful Improvements in Eyeglasses, of which the following is a specification, reference being had to the accompanying drawings, making part of the same, in which—

Figure 1:
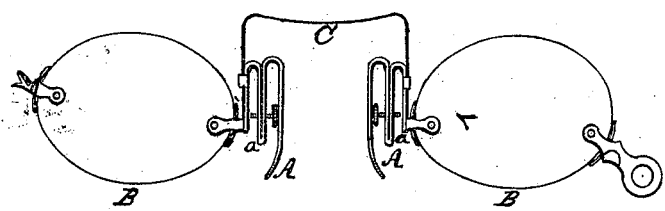
Figure 2:
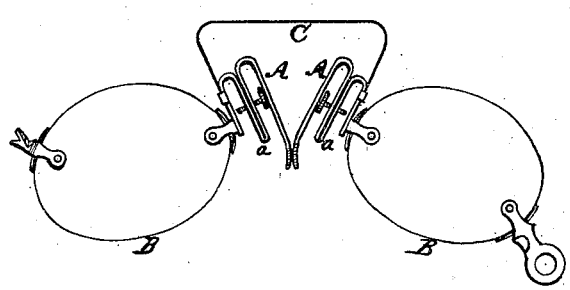
Figure 3:
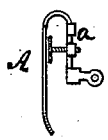
Figure 4:
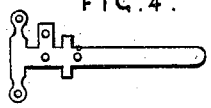
Figure 5:
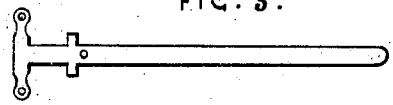

Figure 1 represents a plan or front view of the glasses in the position they will stand in relation to each other when upon the face; Fig. 2, a similar view, showing the position they assume when removed from the face; Fig. 3, a modification of the adjustable spring; Fig. 4, a plan of a piece of metal, from which the modified form of spring shown in Fig. 3 may be made; and Fig. 5, a plan from which the spring as shown in Figs 1 and 2 may be made from a single piece of metal, if desired.

The object of my invention is so to construct or connect a pair of eyeglasses that when in use they will be in a line straight across the face, like the ordinary spectacles, so that the frame or margin of the lens will in no way obstruct the sight; also, to regulate their clamping-pressure to any degree desired to make them a comfortable and easy fit, and to accomplish which I construct a spring, A, of the form shown in the drawings, having a set-screw passing through the portion *a* thereof, so that, by turning it either one way or the other, (to the right or left,) it will either separate or allow the branches of the spring to approach each other. This spring may be attached to the lens itself, as shown, or to the frame of a lens, in any suitable manner. To each lens B I have shown one of my improved springs attached, and the two springs connected by a spring, C, of the form shown.

Although I have shown the spring A as connected with each lens of a pair of eyeglasses, I have found that one will answer. This spring may be made as shown in Fig. 3.

The glasses may be folded and locked in the ordinary manner.

It will be observed that the springs A' A and C, when connected, form an adjustable spring-clamp, for holding the glasses secured thereto to the face.

What I claim as of my own invention is—

1. The spring-clamp for eyeglasses, made adjustable by a set-screw, substantially as and for the purpose set forth.

2. The spring A for eyeglass-clamps, made adjustable, substantially as shown and described.

In testimony whereof I have hereunto subscribed my name.

ISAAC ALEXANDER.

Witnesses:
 FRED. STEBBINS,
 A. G. DE LONG.